UNITED STATES PATENT OFFICE.

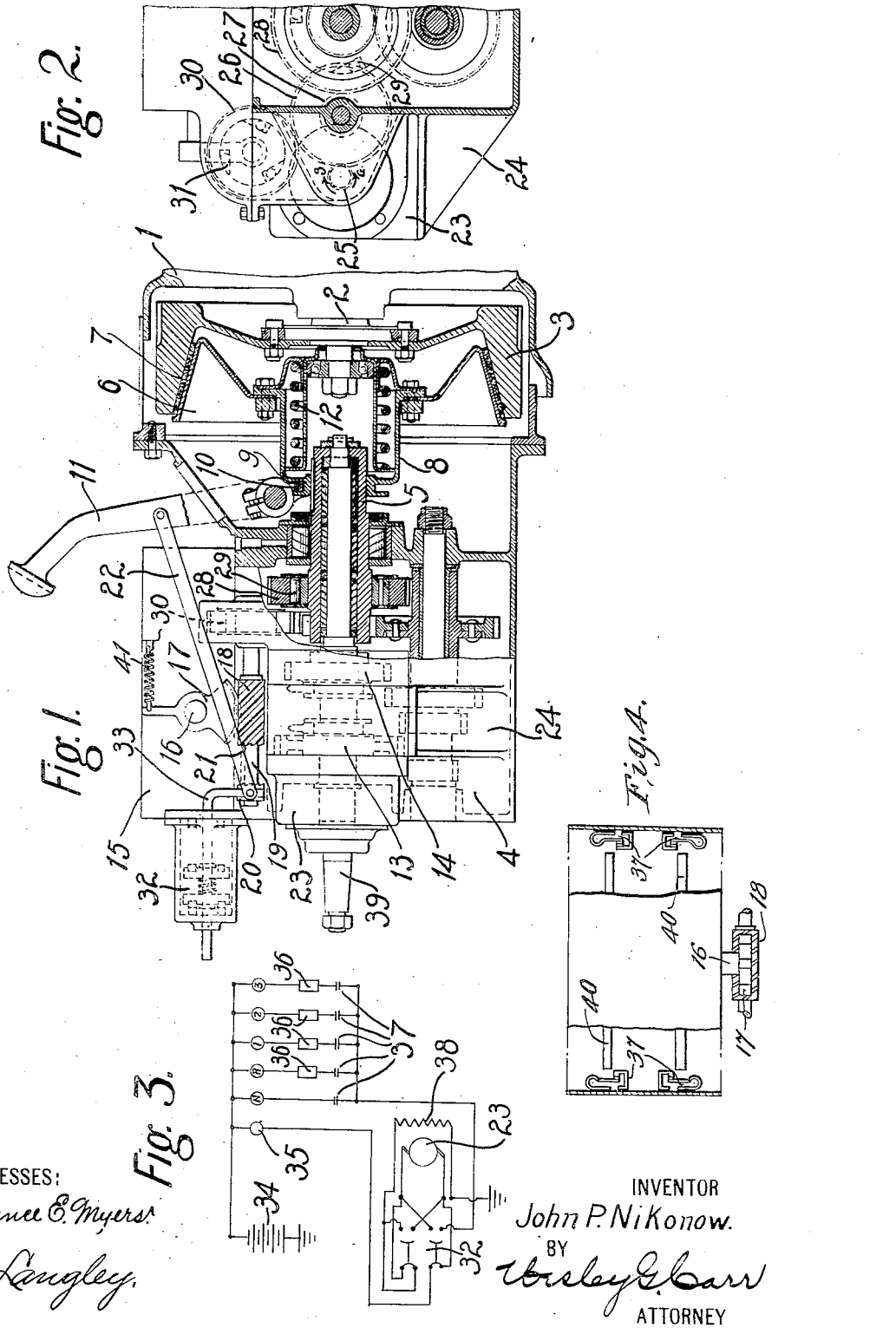
J. P. NIKONOW.
STARTING AND GEAR SHIFTING MECHANISM.
APPLICATION FILED AUG. 7, 1914.
1,206,024.  Patented Nov. 28, 1916.

JOHN P. NIKONOW, OF WILKINSBURG, PENNSYLVANIA, ASSIGNOR TO WESTINGHOUSE ELECTRIC AND MANUFACTURING COMPANY, A CORPORATION OF PENNSYLVANIA.

STARTING AND GEAR-SHIFTING MECHANISM.

1,206,024. Specification of Letters Patent. Patented Nov. 28, 1916.

Application filed August 7, 1914. Serial No. 855,594.

*To all whom it may concern:*

Be it known that I, JOHN P. NIKONOW, a subject of the Czar of Russia, and a resident of Wilkinsburg, in the county of Allegheny and State of Pennsylvania, have invented a new and useful Improvement in Starting and Gear-Shifting Mechanism, of which the following is a specification.

My invention relates to starting and gear-shifting mechanisms and particularly to means for effecting the changes in speed ratio of the transmission mechanisms of automobiles or other motor vehicles.

My invention has for its object to provide a simple arrangement whereby the usual starting motor of a motor vehicle may be employed to actuate the gear-shifting mechanism.

In the operation of manually operated gear-shifting mechanisms, considerable power is required to effect the various changes in speed ratio. It has been proposed to provide a separate power device for actuating such mechanisms but such devices are not only expensive but add materially to the weight of the vehicle.

According to my present invention, I provide a simple means for employing the usual starting motor to actuate the gear-shifting mechanism. The functions of the starting motor are automatically controlled by the clutch pedal. The mechanism is so arranged that the movable gear wheels of the transmission mechanism are shifted only when the transmission clutch is disengaged.

In the accompanying drawings, Figure 1 is a view, partially in elevation and partially in longitudinal section, of the transmission mechanism of an automobile and its related parts, with my invention applied thereto. Fig. 2 is a view, partially in elevation and partially in transverse section, of the mechanism of Fig. 1. Fig. 3 is a diagrammatic view of the circuits and apparatus embodying my invention. Fig. 4 is a diagrammatic view illustrating the limit switches and controlling means therefor.

Referring particularly to Figs. 1 and 2, an automobile engine 1, only a portion of which is shown, has a shaft 2 upon which is mounted the usual fly wheel 3. The transmission mechanism or change speed gear mechanism 4 of the vehicle is connected to the engine shaft 2 by a rotatably mounted sleeve member 5 and a conical clutch member 6 which coacts with a correspondingly shaped clutch member 7 formed in the fly wheel 3. The clutch member 6 is connected to the sleeve member 5 by a sleeve member 8 that is slidably mounted on the sleeve member 5 and is rotatable therewith. The sleeve member 8 is provided with an integral grooved collar member 9 to be engaged by a yoke member 10 that is connected to the usual clutch pedal lever 11. A spring 12 normally retains the clutch member 6 in engagement with the clutch member 7 in the fly wheel 3 with the clutch pedal lever 11 in its rearward position.

The details of the transmission mechanism 4 form no part of the present invention. It may be noted, however, that it comprises two movable gear wheels 13 and 14 that are shifted into such relations with coacting gear wheels as to produce the desired speed ratios. The gear wheels 13 and 14 are connected by any suitable means (not shown) to a gear-shifting mechanism indicated at 15.

The details of the gear-shifting mechanism 15 form no part of the present invention and they are, accordingly, neither illustrated nor described except in connection with the electrical controlling means to be later described in connection with Fig. 3. The gear shifting mechanism comprises a shaft 16 to which power may be applied for the actuation of the mechanism. A segmental gear 17 is fixedly mounted on the shaft 16 and meshes with a reversible worm 18 that is loosely mounted on a shaft 19. A clutch member 20, which is slidably mounted on the shaft 19, coacts with a corresponding clutch member 21 formed on one end of the worm 18 to connect the latter to the shaft 19. The clutch member 20 is controlled by the pedal lever 11 to which it is connected by a link 22.

An electric motor 23 is supported by a bracket 24 that is integral with the casing of the transmission mechanism 4. The motor 23 is provided with a pinion 25 which is connected to the sleeve member 5 by means of a gear wheel 26, a pinion 27, a gear wheel 28 and an overrunning clutch 29 of the usual roller type. The pinion 25 is connected to the shaft 19 by means of the gear wheel 26, a gear wheel 30 and an overrunning clutch 31 that is similar to the clutch 29. The clutches 29 and 31 are so arranged that one of them is operative only when the motor operates in one direction and the other is operative only when the motor rotates in the reverse direction. The direction of rotation of the motor is controlled by a reversing switch mechanism 32 that is actuated by a rod 33 which is connected to the clutch member 20.

Reference may now be had to Fig. 3, which is a diagrammatic view of the circuits and apparatus employed in connection with my invention. The motor 23 is supplied with current from a battery 34. The reversing switch mechanism 32 operates, according to its position, to interchange the connection of the motor terminals to the terminals of the battery. The motor circuit is controlled by a push button 35 which may be located within convenient reach of the operator.

It may be assumed that the gear shifting mechanism is of any well known selective type, such, for example, as that shown and described in a copending application, Serial No. 808,735, filed Dec. 26, 1913 by Otto S. Schairer and assigned to the Westinghouse Electric and Manufacturing Company. It may be assumed further that the gear shifting mechanism is controlled by electromagnets 36 and push buttons designated according to the desired speed ratio as N (neutral), R (reverse) and 1, 2 and 3, for first, second and third speeds, respectively. The motor circuit may be closed by means of any one of the several push buttons for controlling the gear-shifting mechanism. Suitable limit switches 37 are provided to open the circuit of the motor 23 and the electromagnets 36 when the changes in speed ratio have been effected. The limit switches 37 and their arrangement for actuation by the gear shifting mechanism are diagrammatically illustrated in Fig. 4. One of the switches is opened when one of the shift rods 40 is actuated in either direction from a neutral position.

It may be assumed that the various parts are in the respective positions illustrated in Fig. 1. To start the engine, it is only necessary to press the push button 35 to close the motor circuit which extends from the ungrounded side of the battery through the push button 35, reversing switch 32, motor 23, reversing switch 32 and resister 38 to ground, and thence to the battery. The motor then rotates in a clockwise direction, as illustrated in Fig. 2, to rotate the engine shaft through a mechanism comprising the pinion 25, gear wheel 26, pinion 27, gear wheel 28, clutch 29, sleeve members 5 and 8, clutch members 6 and 7, and fly wheel 3. When the engine starts under its own power, the push button 35 is released to open the motor circuit. During the starting of the engine, the gear wheel 30 will be rotated in a clockwise direction, but the clutch 31 is inoperative to rotate the shaft 19. It will be noted that, in order to start the engine, it is necessary that the clutch pedal lever 11 shall be in its rearward position in order that the clutch members 6 and 7 may be in engagement and that the reversing switch 32 shall be in such a position as to cause the motor to rotate in the proper direction.

When it is desired to connect the engine shaft to the transmission shaft 39 of the vehicle, one of the push buttons for controlling the gear shift is actuated. It may be assumed, for example, that it is desired to start on first speed and the corresponding push button 1 is accordingly actuated. The circuit through the corresponding electromagnet 36 and the motor 23 is not completed by the push button 1 because the circuit is broken by the reversing switch 32 when the pedal lever 11 is in such a position that the clutch is connected. The pedal lever 11 is then actuated forwardly to simultaneously disengage the clutch members 6 and 7, to connect the clutch members 20 and 21 and to complete the motor circuit through the reversing switch 32. The motor circuit extends from the ungrounded side of the battery, through the push button 1, electromagnet 36, limit switch 37, reversing switch 32, motor 23, reversing switch 32 and resister 38 to ground and thence to the battery. The motor then rotates in a counter clockwise direction, as illustrated in Fig. 2, to actuate the gear-shifting mechanism through the pinion 25, gear wheel 26, gear wheel 30, clutch 31, shaft 19, clutch members 20 and 21, worm 18, segmental gear wheel 17, and shaft 16. The gear-shifting mechanism is so arranged that the corresponding limit switch 37 is opened at the end of the path of movement of the gear-shifting mechanism and thereby opens the circuit of the motor. The operator then releases the clutch pedal lever 11 to permit the spring 12, which has been compressed, to effect the engagement of the clutch members 6 and 7 and to return the clutch member 20 and the reversing switch 32 to the respective positions illustrated in Fig. 1. A spring 41, which has been placed under tension, operates to return the segmental gear wheel 17 and the worm 18 to their respective normal positions. The engine shaft 2 is now connected through the clutch members 6 and 7 and the transmission mechanism 4 to the main transmission shaft 39 of the vehicle. During the gear-shifting operation, the gear wheel 28 is rotated in a counter clockwise direction, but the clutch 29 is inoperative to connect the gear wheel 28 to the engine shaft. When it is desired to change the speed ratio, the push button corresponding to the desired speed is actuated and the gear-shifting mechanism operates in the manner above described, in connection with the first speed connection, to arrange the movable gear wheels 13 and 14 to produce the desired speed ratio.

It will be noted that I provide an arrangement by means of which the usual starting motor may be rotated in reverse directions to actuate the engine shaft and the gear shifting mechanism, respectively. The operation of the motor for the different functions is controlled by the pedal lever 11. The engine may be started only when the engine clutch is in engagement and the gear-shifting mechanism may be actuated only when the engine clutch is out or disengaged. In a practical embodiment of my invention, the various parts are so constructed as to have sufficient mechanical strength to withstand the shock incident to the inertia of the various moving parts.

I claim as my invention:

1. The combination with an engine shaft, a gear-shifting mechanism, and a motor, of means for operatively connecting said motor either to said engine shaft or to said gear-shifting mechanism.

2. The combination with an engine shaft, a gear-shifting mechanism, and a motor, of means for operatively connecting said motor to said engine shaft or to said gear-shifting mechanism according to the direction of rotation of said motor.

3. The combination with an engine shaft, a gear-shifting mechanism, and a motor, of means for operatively connecting said motor to said engine shaft or to said gear-shifting mechanism according to the direction of rotation of said motor, and means for controlling the direction of rotation of the motor.

4. The combination with an engine shaft, a transmission mechanism, and a gear-shifting mechanism for controlling said transmission mechanism, of a motor, and means for selectively connecting said motor to said engine shaft and to said gear-shifting mechanism.

5. The combination with an engine shaft, a gear-shifting mechanism, and a motor, of automatic means comprising one-way mechanisms for operatively connecting said motor either to said engine shaft or to said gear-shifting mechanism, according to the direction of rotation of said motor.

6. The combination with an engine shaft, a clutch connected thereto, a gear-shifting mechanism, and a motor, of means for operatively connecting said motor to said shaft and to said mechanism, and means for simultaneously controlling the position of said clutch and the direction of rotation of said motor.

7. The combination with an engine shaft, a clutch comprising a movable member connected thereto, a gear-shifting mechanism, and a motor, of means for operatively connecting said motor either to said shaft or to said mechanism, according to the position of said movable clutch member.

8. The combination with an engine shaft, a clutch connected thereto, a member for controlling said clutch, a gear-shifting mechanism, and a motor, of means for operatively connecting said motor to said gear-shifting mechanism and to said shaft, and means comprising said clutch-controlling member for controlling said connecting means.

9. The combination with an engine shaft, a clutch comprising a movable member connected thereto, a gear-shifting mechanism, and a motor, of means for operatively connecting said motor to said shaft when the movable clutch member is in an operative position and for operatively connecting said motor to said mechanism when the movable clutch is in an inoperative position.

10. The combination with an engine shaft, a clutch connected thereto, a pedal lever for controlling said clutch, a gear-shifting mechanism, and an electric motor, of means for operatively connecting said motor either to said shaft or to said mechanism according to the direction of rotation of the motor, and a reversing switch for said motor controlled by said clutch pedal lever.

In testimony whereof, I have hereunto subscribed my name this 27th day of July 1914.

JOHN P. NIKONOW.

Witnesses:
  B. B. Hines,
  M. C. Merz.